H. L. WINSLOW.
APPARATUS FOR RECOVERING BLOW-OFF PRODUCTS FROM BOILERS AND CONSERVING THE HEAT ENERGY THEREIN.
APPLICATION FILED DEC. 9, 1907.
973,603.
Patented Oct. 25, 1910.
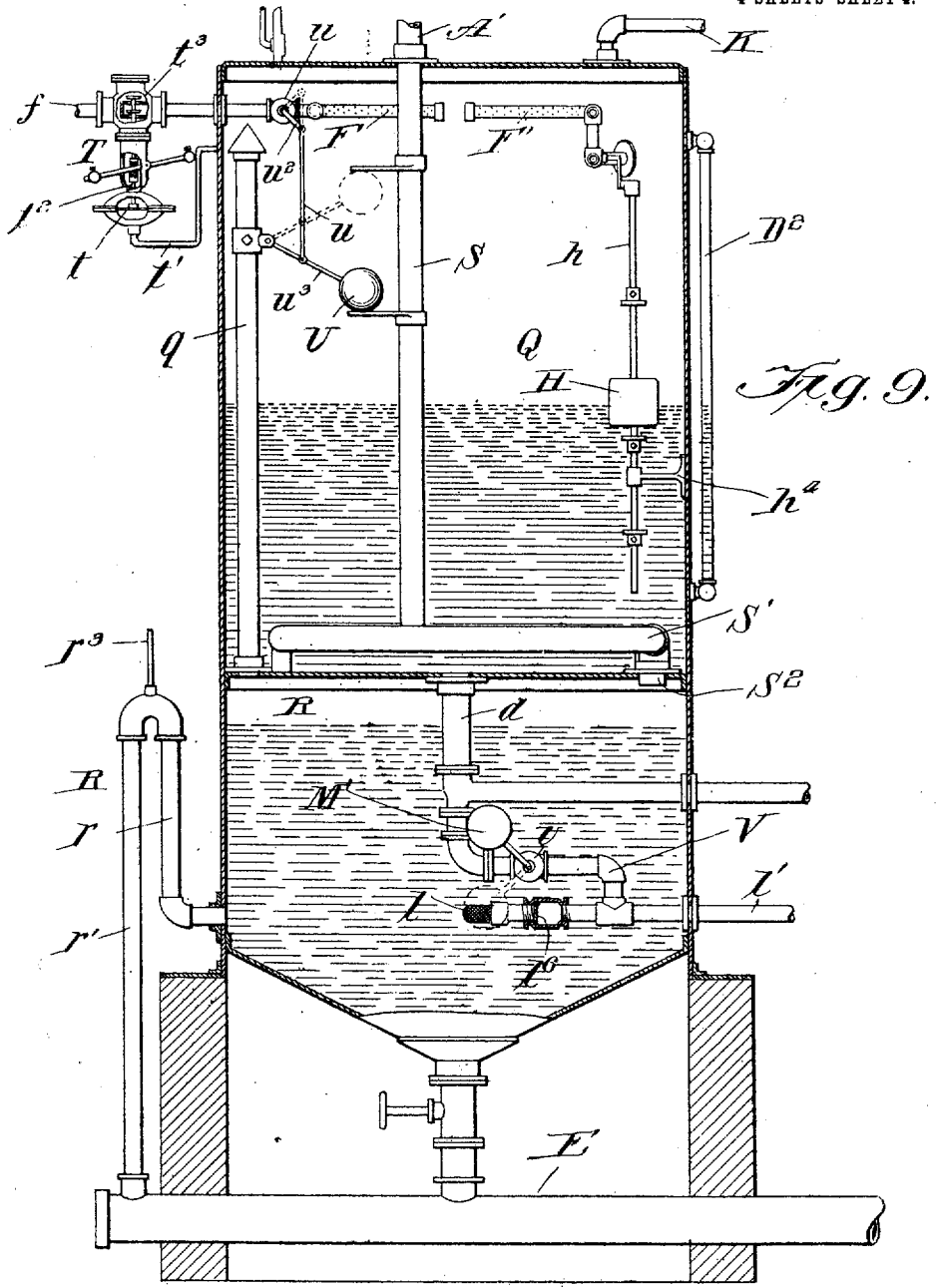

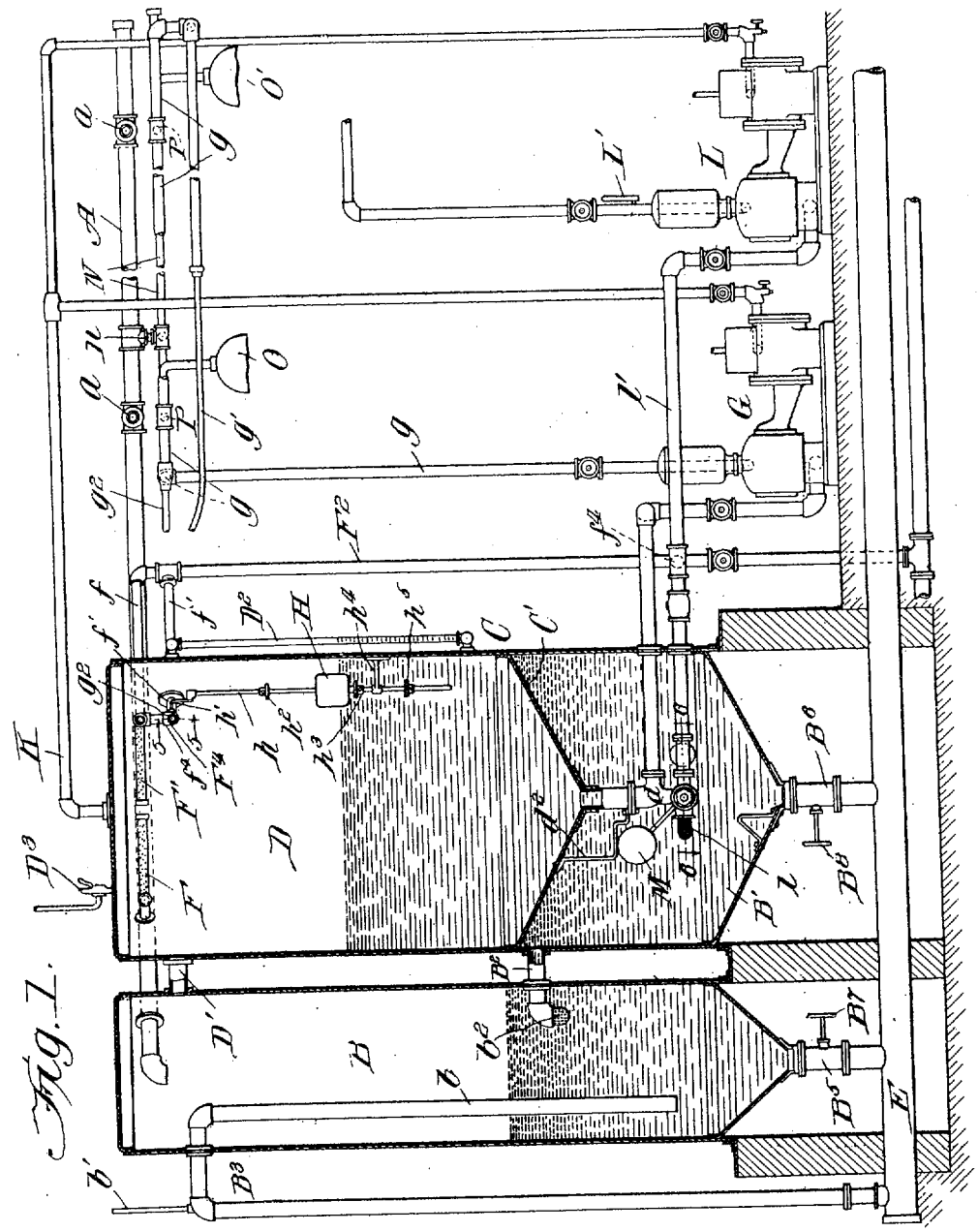

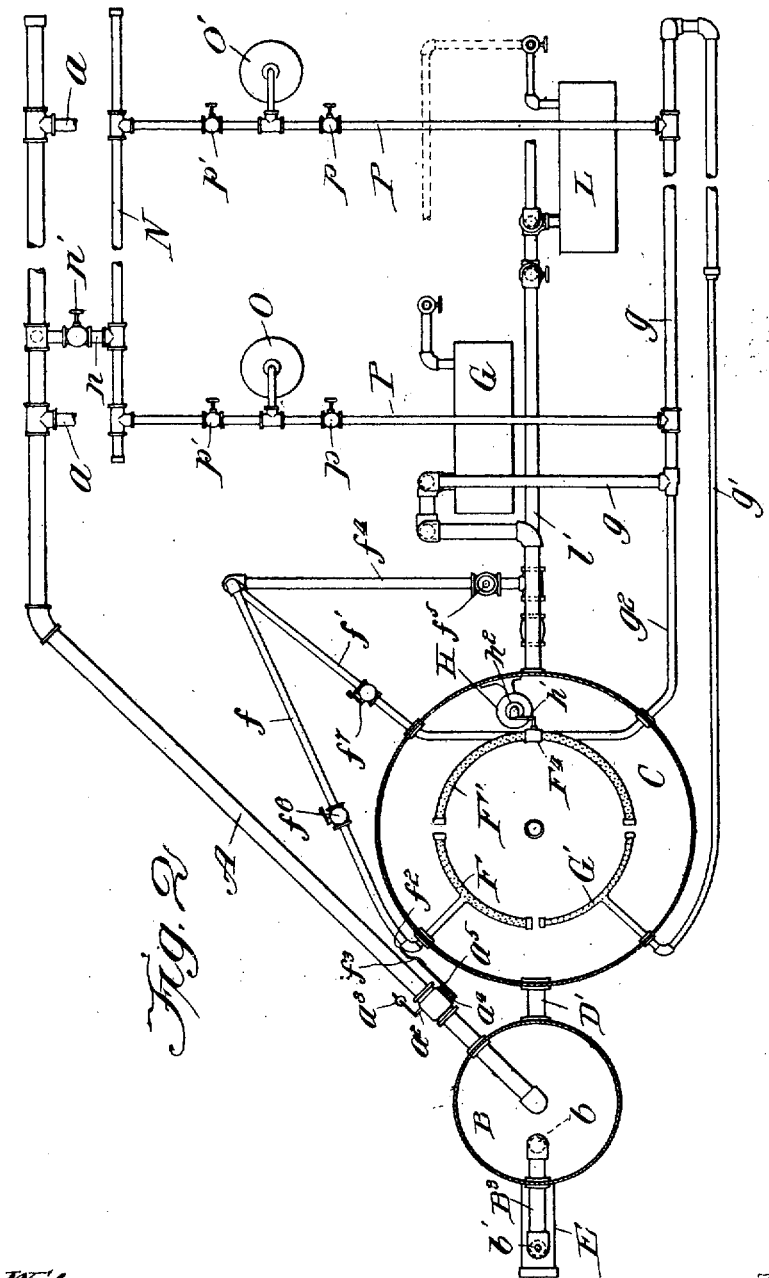

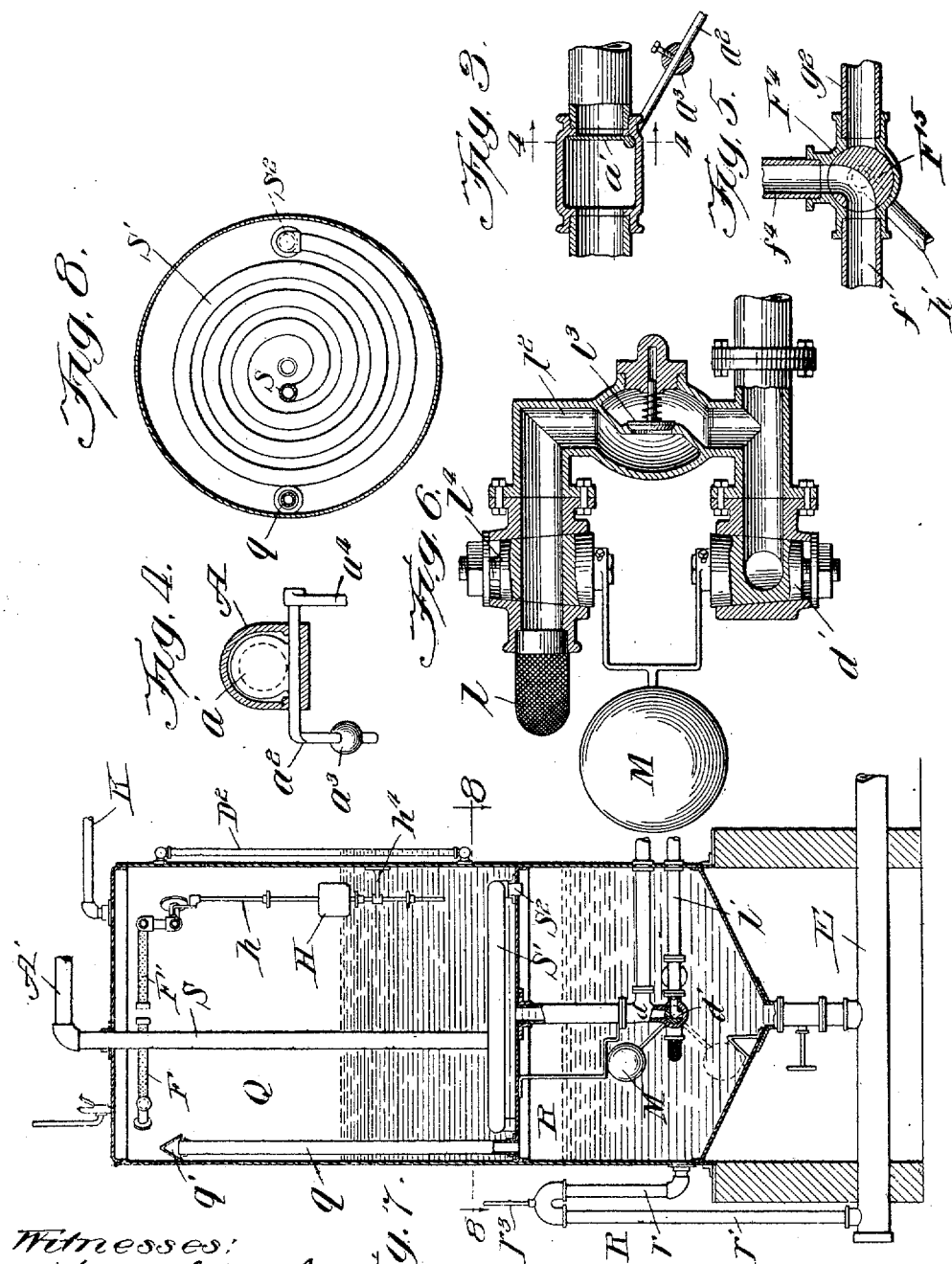

UNITED STATES PATENT OFFICE.

HORACE L. WINSLOW, OF CHICAGO, ILLINOIS.

APPARATUS FOR RECOVERING BLOW-OFF PRODUCTS FROM BOILERS AND CONSERVING THE HEAT ENERGY THEREIN.

973,603. Specification of Letters Patent. Patented Oct. 25, 1910.

Application filed December 9, 1907. Serial No. 405,698.

*To all whom it may concern:*

Be it known that I, HORACE L. WINSLOW, a citizen of the United States, residing at Chicago, county of Cook, State of Illinois, have invented a certain new and useful Improvement in Apparatus for Recovering Blow-Off Products from Boilers and Conserving the Heat Energy Therein, and declare the following to be a full, clear, and exact description of the same, such as will enable others skilled in the art to which it pertains to make and use the same, reference being had to the accompanying drawings, which form a part of this specification.

It is a not uncommon practice, particularly in the round houses of railroad systems, to make provision for utilizing the blow-off products from steam boilers in order to furnish a supply of wash-out water, and also to raise the temperature of fresh water which may be used as feed-water or for any other purpose.

The object of my invention is to provide a simple and novel apparatus whereby the blow-off products from a boiler may be recovered, partly in the form of pure water, and the heat therein conserved in the most efficient manner.

To the above end I cause the blow-off products to be delivered into a reservoir from which the steam, constituting a part of the blow-off products or which is formed by vaporization of the hot liquid element of the blow-off products, is recovered and commingled with fresh water. By this means a portion of the blow-off products may be used over again in the same way as fresh water; and, at the same time, the intermingling thereof in the form of vapor with the fresh body of water permits the heat contained therein to be saved without appreciable loss. That portion of the blow-off products which remains in the reservoir in the form of liquid may be used for wash-out purposes or for any other purpose which does not require water of the purity of feed water.

In a preferred form of my invention, the vapor which is recovered is led into a reservoir into the top of which fresh water is sprayed, so that the vapor is brought into direct contact with a finely divided mass of fresh water and is rapidly and economically condensed.

As subsidiary features of my invention, I provide means whereby the quantity of water which is sprayed into the fresh-water reservoir is controlled either by the flow of the blow-off products or by the amount of water contained within the reservoir, or by both. By causing the delivery of the fresh water to be controlled by the flow of the blow-off products, the fresh water may, if desired, be cut off automatically as soon as the pressure within the blow-off conduit falls to such a point that no considerable amount of vapor may be recovered, and the temperature of the water which has already been heated will not be unduly diminished. By causing the delivery of fresh water to be controlled by the quantity of water within the feed-water or main reservoir, the supply may be shut off or diminished before the level of the water in the reservoir reaches the over-flow point; waste of fresh water and of heat units being thereby prevented.

The water from the main reservoir will usually be drawn off by a pump which carries it to points where heated fresh water is required. I prefer, as a further subsidiary feature of my invention, to provide means whereby, when the supply of fresh water is reduced due to a rising level of the water in the main reservoir, a return connection is made from the pump to the main reservoir; thus causing a circulation of the water within the main reservoir to be maintained in order to take advantage of the heat in vapor which may enter the main reservoir in the manner previously described or from conduits which deliver the exhaust steam from the pumps or other apparatus.

The water remaining in the reservoir containing the impure water or, as I shall hereafter designate it, the auxiliary reservoir, may be drawn off by a wash-out pump and, as a further subsidiary feature of my invention, I prefer to provide means for connecting the suction side of the wash-out pump to the main reservoir when the supply of water in the auxiliary reservoir is exhausted; thereby permitting the impure water to be used as long as it lasts and then providing a supply of heated fresh water to satisfy any further demand upon the wash-out pump.

It may at times be advantageous to supply live steam to a boiler which is being refilled and, as a further subsidiary feature of my invention, I provide means whereby the steam from a boiler which is being blown off may be delivered directly to another boiler.

My invention also comprises other novel features of construction and arrangement of parts which will be apparent hereinafter from the detailed description taken in connection with the accompanying drawings, wherein:

Figure 1 is a diagrammatic view of a system adapted to be installed in a round house, the reservoirs being shown in cross section; Fig. 2 is also a diagrammatic view represented as being a plan of the arrangement shown in Fig. 1 and the reservoirs being again shown in section; Fig. 3 is a section through the main blow-off pipe, showing the valve for controlling the delivery of fresh water; Fig. 4 is a section taken on line 4—4 of Fig. 3; Fig. 5 is a section taken on line 5—5 of Fig. 1; Fig. 6 is a section taken on line 6—6 of Fig. 1; Fig. 7 is a section through a modified form of the main and auxiliary reservoirs; Fig. 8 is a section on line 8—8 of Fig. 7, and Fig. 9 is a view similar to Fig. 7, showing a modification.

Referring more particularly to the arrangement shown in the first seven figures, A is a blow-off pipe or main which passes through the round house and is provided at intervals with connections $a$ which are adapted to receive the blow-off products from locomotive boilers and carry them to the main. The blow-off pipe leads to a reservoir which I shall term the auxiliary reservoir, and there discharges the blow-off products which it may have received. The auxiliary reservoir may take any suitable form, that shown in the present instance consisting of two separate receptacles B and B' which are connected together by means of a conduit $B^2$. The member B' of the auxiliary reservoir, is illustrated as forming the lower portion of a vessel or receptacle C which is provided intermediate its ends with a wall C' so as to divide it into two independent parts, the upper of which D constitutes what I shall hereinafter designate the main reservoir. The main reservoir and the auxiliary reservoir, preferably the member B, are connected near their upper ends by means of a conduit D'.

It will be seen that when the hot blow-off products are discharged into the member B of the auxiliary reservoir, the vapor which constitutes a part of such products or which is formed due to vaporization of the hot liquid which enters the auxiliary reservoir, passes through the conduit D' into the main reservoir. The liquid portion of the blow-off products which does not vaporize remains within the auxiliary reservoir, flowing through the conduit $B^2$ until the member B' of the auxiliary reservoir is filled and then rising within the member B until an over-flow point is reached. In order to prevent the dirty water in the auxiliary reservoir from flowing through the conduit D' into the main reservoir, I provide an over-flow connection $B^3$ through which the water in the auxiliary reservoir flows into a sewer or other waste pipe E. The over-flow device preferably consists of a U-shaped member one of the arms $b$ of which is arranged within the member B of the auxiliary reservoir and has its open end located near the bottom thereof. A suitable vent, such as $b'$, is provided at the highest point in the member $B^3$ so as to prevent a siphon action. It will be seen that when the water in the auxiliary reservoir rises to a predetermined point, it will begin to flow through the over-flow device; but instead of the water being taken from an upper level it will be taken from near the bottom of the reservoir so that the water which is wasted is that which is the coolest and least pure.

The steam which enters the main reservoir in the manner described is commingled with cold fresh water and, in condensing, imparts heat to the fresh water. The water which is so heated may be used for feed water or for any other purpose for which heated pure water may be desired. By causing the recovered vapor to mingle with the fresh water, a considerable portion of the blow-off products may be saved in the form of pure water which can be re-used for filling the boiler from which it has been taken or any other boiler. Where the temperature and pressure at which the blow-off products are discharged are high, the amount of pure water which is recovered in the form of condensed steam may be very great.

In order to get the most rapid and efficient results I prefer to introduce the fresh water into the main reservoir in the form of spray so that, as the steam enters the reservoir, it is brought into intimate engagement with finely divided particles of water and is instantly condensed while imparting its heat to the cold water without appreciable loss. The spraying device illustrated consists of two arc-shaped perforated tubes F and F' arranged within the top of the main reservoir and supplied with fresh water through conduits or pipes $f$ and $f'$ leading to any suitable source of supply, such as a fresh water main $F^2$.

In order to control the fresh water supply I prefer to provide some means which operates automatically, so long as the blow-off process continues, to permit the delivery of water to the spraying apparatus, but shuts off the fresh water when the blow-off process ceases; this preventing an undue cooling of the water within the main reservoir due to the delivery of an excess of cold water without requiring the same careful attention on the part of the operator that would otherwise be necessary.

A convenient method of controlling the supply of fresh water consists in making use of a valve $a'$ in the blow-off pipe, which valve is so arranged that it will be operated by the blow-off products as long as the pressure is above the point below which it is impracticable to go. This valve may be connected to an ordinary plug valve $f^2$ in the pipe $f$, the parts being so proportioned that, as long as there is more than the minimum pressure within the blow-off pipe, the valve $f^2$ will be held wholly or partially open, but will be closed when the pressure falls; thereby permitting cool water to be supplied to the spraying device F as long as it is desired and shutting off the cold water when it is no longer desired. The valve $a'$ may conveniently be provided with an arm $a^2$ upon which is adjustably secured a weight $a^3$. By shifting the position of the weight upon the arm the pressure at which the valve becomes effective may be varied. The connection between the valves $a'$ and $f^2$ may take any suitable form, as for example, the valve $a'$ may be provided with a crank arm $a^4$ which is connected by a link $a^5$ to the handle $f^3$ of the other valve.

The heated pure water may be drawn from the main reservoir by means of a feed pump G and forced to various parts of the round house through a feed water conduit $g$. From an examination of Fig. 2 it will be seen that the conduit $g$, after completing the circuit about the round house, ends in a pipe of small diameter $g'$ which is connected to a spraying device G' in the main reservoir. By this arrangement a continual circulation of the water within the main reservoir is maintained; such of the water as is drawn from the main reservoir by the feed pump and carried through the conduit $g$ without being used in its passage through the round house is returned into the top of the reservoir in the form of spray and again brought into intimate contact with the steam which is being received by the reservoir. The inlet end of the conduit $g$ is connected to a small pipe $g^2$ which is adapted to return to the main reservoir some of the water which has been drawn therefrom in a manner which will now be described. The pipe $f'$ is not connected directly to the spraying device F' but leads into one side of a valve casing $F^4$ which is connected to the member F' by means of a short piece of pipe $f^4$. The pipe $g^2$ is also connected to the valve casing $F^4$. Within the valve casing is a two-way valve $F^5$ so arranged that in one position thereof it connects the pipe $f'$ to the spraying device, while in its other position it connects the pipe $g^2$ to the spraying device. By properly controlling this valve, the spraying device F' may be caused to deliver either warm or cool water into the reservoir. I propose to control the valve $F^5$ in such a manner that it will automatically shift the connection to the spraying device upon a variation of the water level in the main reservoir within predetermined limits.

It is of course evident that when the main reservoir is nearly full, and there is perhaps but little fresh water being used throughout the system, it will be a waste to supply any considerable quantity of cold fresh water, since this would only cause the reservoir to over-flow through the conduit D'; and, if the auxiliary reservoir were already full, to entirely waste, not only the excess of fresh water, but also the heat units which had been taken up thereby. I therefore arrange within the main reservoir a float H which is loosely mounted upon a vertical rod $h$ attached to the handle $h'$ of the valve $F^5$. The movement of the float upon the rod may be limited by collars $h^2$ and $h^3$ which are adapted to be adjusted longitudinally of the rod. When the water level in the main reservoir is low, the float rests upon the collar $h^3$; this collar in turn rests upon a guiding bracket $h^4$. The connections are such that the valve $F^5$ is in the position shown in Fig. 6, namely it connects the cold water pipe $f'$ to the sprayer. Upon a rise in the water level, the float is lifted from the collar $h^3$ and is carried upwardly until it engages with the collar $h^2$. As the water thereafter continues to rise, the rod $h$ is lifted bodily by means of the float, and the valve $F^5$ is shifted into its other operative position wherein it connects the spraying device F' with the hot water pipe $g^2$. A third collar $h^5$ may be provided upon the rod beneath the bracket $h^4$ so as to limit the upward movement of the rod.

It will be seen that there is at all times a circulation of the heated water, even though there be no flow of blow-off products in the system. This circulation of the heated water is of value, however, not only for the purpose of maintaining a uniform temperature throughout the mass of water within the reservoir, but also for utilizing the heat units contained in steam which may enter the main reservoir through a conduit K. This conduit is connected to the exhaust side of the pumps or other auxiliary apparatus in the round house and therefore is continually supplying steam which may be made to impart its heat to the water within the reservoir in the most satisfactory manner by spraying the water already contained in the reservoir so as to bring it into intimate contact therewith.

The water in the auxiliary reservoir may be used for wash-out purposes and the like as the greater portion of the solid matter will be precipitated, thereby leaving the bulk of the water sufficiently clear for the purpose specified. By making the auxiliary reservoir of two sections, the bulk of the impurities will settle in the first section and, by placing a fine screen $b^2$ across the inlet to the conduit $B^2$, the water which enters the second section is fairly clear and a further settling of the impurities in the latter section adds still further to the clearness of the water.

L is a wash-out pump whose suction side is connected to the section $B'$ of the auxiliary reservoir at a point sufficiently removed from the bottom thereof to avoid the entrance of the dirty water which will be found in the bottom. The water from the auxiliary reservoir may be drawn through a strainer $l$ so that the water which is delivered by the wash-out pump differs greatly from the water which enters the auxiliary reservoir from the blow-off main.

It may sometimes happen that the demand upon the wash-out pump is greater than the supply which is afforded by the auxiliary reservoir. I provide means, whereby, when this occurs, the wash out pump is connected directly to the main reservoir and continues thereafter to provide heated fresh water to the wash-out main until the auxiliary reservoir again contains water. To this end the suction pipe $l'$ of the wash-out pump is connected to the delivery pipe $d$ at the lower end of the main reservoir by means of a valve $d'$, this valve being arranged to connect the pipe $l'$ to the main reservoir or to close communication between this pipe and the main reservoir. The inlet (through the strainer $l$) from the auxiliary reservoir is through a section of pipe $l^2$ which communicates with the pipe $l'$ at a point between the pump and the valve $d'$. There is a check valve $l^3$ in the pipe $l^2$ which prevents a back flow of water from the pump or main reservoir through the pipe $l^2$ and into the auxiliary reservoir. There is preferably also a valve $l^4$ between the inlet to the pipe $l^2$ and the check valve, the valve $l^4$ being adapted to control the communication between the auxiliary reservoir and the pipe $l^2$.

M is a float which is connected to the movable members of both of the valves $d'$ and $l^4$. The relation of the valves $d'$ and $l^4$ is such that when the one places the suction pipe of the wash-out pump in communication with the main reservoir the other closes communication with the auxiliary reservoir and, when the one closes communication between the suction side of the wash-out pump and the main reservoir the other opens communication between the wash-out pump and the auxiliary reservoir. The float is so arranged that when the water level in the auxiliary reservoir is at or above the top of the inlet to the pipe $l^2$, the valve $d'$ is closed and the valve $l^4$ is opened. If the water level falls, the valve $d'$ is gradually opened and the valve $l^4$ closed until the pump is connected directly with the main reservoir and is entirely shut off from the auxiliary reservoir. Upon a rise of the water level above the low water mark, the float is carried upward until it engages with a stop $d^2$, the valve $d'$ being held closed and the valve $l^4$ open. It will be seen that by this arrangement the wash-out pump will always be supplied with water, but none of the fresh water will be consumed except when it becomes absolutely necessary due to a lack of supply of the impurer water in the auxiliary reservoir.

The suction pipe $l'$ is connected to the fresh water main by means of a pipe $f^4$ so that, if the temperature of the water being supplied by the reservoirs is too high, cold water may be drawn in until the proper temperature is reached. The temperature of the wash-out water may be determined by means of a thermometer connected with the discharge side of the wash-out pump. In the pipe $f^4$ there is a manually controlled valve $f^5$ whereby the operator may regulate the quantity of cold water drawn into the wash-out pump. It will of course be understood that there are also manually controlled valves, such as $f^6$ and $f^7$, in the pipes $f$ and $f'$.

The section B of the auxiliary reservoir is connected to the waste pipe E by means of a conduit $B^5$ leading from the bottom thereof and the section $B'$ of the auxiliary reservoir is connected to the same pipe by means of a conduit $B^6$ also leading from the bottom thereof. By opening the valves $B^7$ and $B^8$ the two sections of the auxiliary reservoir may be drained and the auxiliary reservoir cleaned. The main reservoir may be provided with a water gage $D^2$ so that the operator may at all times be apprised of the level of the water in the main reservoir. The main reservoir may also be provided with a pop valve $D^3$ set so as to prevent the creation of any undue pressure in the main reservoir, such pressure of course acting as a back pressure on the boiler which is being blown off.

Often, when boilers are blown off, there is a considerable head of steam so that it would be of considerable advantage to be able to transfer this steam directly to another boiler which is being refilled, as it would thereby be possible to provide the latter boiler with sufficient steam to permit the locomotive to be operated. To this end I provide an auxiliary blow-off main N which is adapted to be connected to the steam domes of the boilers so as to receive only live steam. This auxiliary main is connected to the main A by means of a pipe $n$ having therein a valve $n'$. By opening the valve $n'$, the steam may be led directly into the main A and delivered with the rest of the blow-off products into the auxiliary reservoir. When it is desired to transfer steam from one steam dome to another, as for example from O to O', the valve n' is closed and the connections between the main N and the two domes are opened. The steam then passes from the one dome to the other until the pressure in the two boilers is equalized and thereafter the steam remaining in the boiler which is being blown off may be diverted into the auxiliary reservoir.

In the drawings I have illustrated the main N as connected to the feed-water main g by means of a series of pipes P. Valves p are placed in these pipes between the connections to the domes and the feed-water main. Valves p' are placed in these pipes between the connections to the domes and the steam main. Normally all of these valves are closed. When one of the valves p is opened feed water is introduced into the corresponding dome. When two of the valves p' are opened a transferrence of steam between corresponding domes takes place. When only one of the valves p' and the valve n' are opened a transferrence of steam from the corresponding dome to the main A takes placed.

In Figs. 7 and 8 I have illustrated a somewhat different form of reservoirs. The auxiliary reservoir is made in a single section and is located in the same relation with respect to the main reservoir as the section B' of the auxiliary reservoir in the other modification. The main reservoir is indicated by Q and the auxiliary reservoir by R. The steam connection between the two reservoirs is through a pipe q which opens at its lower end into the top of the auxiliary reservoir and at its upper end into the top of the main reservoir. $q'$ is a shield over the top of the pipe to prevent the entrance of water from the spraying apparatus. The pipe q may perform also the function of an overflow pipe for the main reservoir since, when the level of the water in the main reservoir rises above the top of the pipe, an over-flow takes place through the pipe into the lower reservoir. The water in the auxiliary reservoir is prevented from backing up through the pipe q by means of an overflow device R' which corresponds to the over-flow device $B^2$ in the other form. This over-flow device comprises a U-shaped member, one leg of which, r, is connected to the auxiliary reservoir near the bottom thereof, while the other member r' is connected to a waste pipe E. $r^2$ is a vent at the highest point of the overflow device. The blow-off main may, in this form of my invention, be connected to a pipe S which passes down through the main reservoir and ends in a coil S' arranged in the bottom of the main reservoir. The blow-off products pass through this pipe, through the coil and then into the auxiliary reservoir through a connection $S^2$ between the coil and the top of the auxiliary reservoir. In this way the entire blow-off products are utilized for the purpose of partially heating the fresh water, while the steam which enters into or is formed in the auxiliary reservoir is led into the main reservoir and is condensed and commingled with the fresh water as in the other form of my invention. Otherwise the two systems may be alike.

In Fig. 9 I have shown an apparatus wherein the details are further modified. Thus, instead of controlling the delivery of water to the spraying device F solely by the pressure and flow in the blow-out main, I provide a controlling device T, which is governed by pressure alone and does not depend upon the flow of blow-off products or interfere with the flow thereof when the pressure is low. By this means all of the steam which may enter the blow-off main, even at a very low pressure, is free to make its way to the reservoirs.

The governing device T comprises a diaphragm t which is subjected to the pressure within the steam space in the main reservoir Q, by reason of the connection t' which opens into the top of the main reservoir. A stem $t^2$ connected to the center of the diaphragm operates a valve device $t^3$ which takes the place of the valve $f^2$ in Fig. 2, namely, the valve device $t^3$ is arranged in the pipe f which supplies the spraying device F. The diaphragm is so adjusted that as soon as the blowing off process begins and steam enters the main reservoir so as to create a pressure therein, the valve device $t^3$ is actuated so as to permit cold water to flow through the spraying device. When the blowing off process ceases or reaches such a stage that the steam pressure in the main reservoir is below a predetermined point, the diaphragm actuates the valve device to stop the delivery of cold water to the spraying device F.

It may also happen that when the blowing off process is carried on for an unusual length of time the main reservoir will become full so that any further addition of cold water is simply a waste. I therefore provide a float U which, when the water level in the main reservoir approaches the over-flow point, closes a valve u in the connection between the pipe f and the spraying device F. The valve U may take any usual form and be connected to the float by means of a link u' which is pivotally secured at its opposite ends respectively to the handle $u^2$ of the valve and the stem $u^3$ of the float. In this form of my invention, therefore, the entire flow of cold water ceases when the water level in the main reservoir approaches the over-flow level.

The apparatus shown in Fig. 9 contains also a somewhat modified form of connection between the wash-out pump and the main and auxiliary reservoirs. The suction pipe $l'$ of the wash-out pump extends into the auxiliary reservoir and is provided with a strainer $l$ at the inlet end. The lower end of the delivery pipe $d$ of the main reservoir is connected to the pipe $l'$ by means of an elbow V, the horizontal portion of which lies above the pipe $l'$. $v$ is a valve arranged within the member V and controlled by a float M' so that the valve $v$ is closed when the water level in the auxiliary reservoir rises above a predetermined point and is opened when the level drops below this point. $l^o$ is a check valve arranged in the pipe $l'$ between the strainer and the point of connection of the member V with this pipe.

While I have described in detail preferred embodiments of my invention and the various features thereof as combined in a single system, I do not desire to be limited to the particular details of construction or arrangement so described, nor to the use of the features of my invention in a single system; for, as will be evident from the definitions of my invention constituting the appended claims, my invention may take various other forms than those illustrated and described and the various features thereof may be used either in combination with each other or independently of each other without departing from the spirit and scope of my invention in its several aspects.

It will, of course be understood that while my invention may be used to particular advantage in heating feed water or other pure water, I do not desire to be limited to this extent, since benefits will accrue from the use of my invention even though the spraying devices deliver water having a less degree of purity.

I also desire it to be understood that the impure water which enters the auxiliary reservoir need not be saved but may be allowed to escape, the auxiliary reservoir then serving simply as an enlarged chamber wherein the pressure upon the blow-off products is suddenly removed so as to cause a rapid vaporization of the hot liquid portion; thereby effecting the recovery of a large fraction of the heat units contained in the liquid and also a portion of the liquid itself in pure form.

Having now fully described my invention, what I claim as new and desire to secure by Letters Patent is:

1. In an apparatus of the character described, a main reservoir, an auxiliary reservoir for receiving and retaining blow-off products from a boiler, means for introducing blow-off products from a boiler directly into the auxiliary reservoir, means for conducting steam from the auxiliary reservoir into the main reservoir, means for delivering fresh water into the main reservoir, a pump for drawing water from said main reservoir, and means governed by the water-level in the main reservoir for causing the amount of fresh water delivered to be decreased and a circulation of the water in the main reservoir to be produced by said pump.

2. In an apparatus of the character described, a main reservoir, an auxiliary reservoir for receiving and retaining blow-off products from a boiler, means for introducing blow-off products from a boiler directly into said auxiliary reservoir, means for delivering steam from the auxiliary reservoir into the main reservoir, a plurality of spraying devices for spraying fresh water into the top of the main reservoir, a pump for drawing water from the main reservoir, and means operated automatically when the water in the main reservoir reaches a predetermined level to shut off the supply of fresh water to one of said spraying devices and connect the latter spraying device to the discharge side of said pump.

3. In an apparatus of the character described, a main reservoir, an auxiliary reservoir, means for introducing blow-off products from a boiler into said auxiliary reservoir, means for delivering steam from the auxiliary reservoir to the main reservoir, a pair of spraying devices for spraying fresh water into said main reservoir, a pump for drawing water from said main reservoir, means governed by the flow of the blow-off products to the auxiliary reservoir for controlling the supply of fresh water to one of said sprays, and means operating automatically when the water in the main reservoir reaches a predetermined level to disconnect the other spraying device from the fresh water supply and connect it to the discharge side of said pump.

4. In an apparatus of the character described, a main reservoir, an auxiliary reservoir, means for introducing blow-off products from a boiler into said auxiliary reservoir, means for delivering steam from the auxiliary reservoir to the main reservoir, a pair of spraying devices for spraying fresh water into said main reservoir, a pump for drawing water from said main reservoir, means governed by the flow of the blow-off products to the auxiliary reservoir for controlling the supply of fresh water to one of said sprays, and means operating automatically when the water in the main reservoir reaches a predetermined level to disconnect the other spraying device from the fresh water supply and connect it to the discharge side of said pump, and an exhaust steam pipe leading into said main reservoir.

5. In an apparatus of the character described, a settling reservoir for receiving and retaining blow-off products from a boiler, a main reservoir located in proximity to the settling reservoir, there being a free steam passage between the upper ends of said reservoirs, means for introducing blow-off products from a boiler directly into said settling reservoir, a spraying device for delivering fresh water into the top of the main reservoir, a pump for drawing water from said main reservoir, and means controlled by the water level in the main reservoir for shutting off the supply of said water to said spraying device and connecting the spraying device to the discharge side of said pump.

6. In an apparatus of the character described, a main reservoir, a settling apparatus composed of two compartments for receiving and retaining the blow-off products from a boiler, one part of said settling apparatus being located directly beneath the main reservoir and the other part adjacent to the main reservoir, there being a steam passage between the latter part of the settling apparatus and the main reservoir, means for introducing blow-off products from a boiler into the latter part of the said apparatus and a conduit connecting the two parts of the settling apparatus at a point above the bottom thereof.

7. In an apparatus of the character described, a tank having a transverse partition at a point above the bottom thereof so as to divide the tank into two compartments, a settling reservoir, conduits connecting said settling reservoir with each of said compartments, and means for introducing the blow-off products from a boiler into said settling reservoir.

8. In an apparatus of the character described, a tank having a transverse partition for separating the tank into upper and lower compartments, a settling reservoir arranged adjacent to said tank, a conduit connecting the top of said settling reservoir with said upper compartment, a conduit connecting the settling tank with said lower compartment, means for introducing blow-off products from a boiler into said settling reservoir, and means for spraying water into the top of said upper compartment.

9. In an apparatus of the character described, a tank having therein a transverse partition for dividing the tank into upper and lower compartments, a settling reservoir arranged adjacent to said tank, conduits connecting each of said compartments with said reservoir, means for introducing blow-off products from a boiler into said settling reservoir, a pump for withdrawing water from said lower compartment, and means controlled by the level of the water in said lower compartment for disconnecting the pump from the lower compartment and connecting it with the upper compartment when said level falls below a predetermined point.

10. In an apparatus of the character described, a tank having therein a transverse partition dividing the tank into upper and lower compartments, a settling reservoir arranged adjacent to said tank, conduits connecting each of said compartments to said settling reservoir, means for introducing blow-off products from said boiler into said settling reservoir, a pump, a valve device for connecting the suction side of said pump to either of said compartments, and means controlled by the water level in the lower compartment for actuating said valve.

11. In an apparatus of the character described, a main reservoir, a settling reservoir means for introducing blow-off products from a boiler into said settling reservoir there being a steam passage between the tops of said reservoir, a pump, a valve for connecting the suction side of said pump to either the main reservoir or the settling reservoir, and means controlled by the level of the water within the settling reservoir for actuating said valve.

12. In an apparatus of the character described, a tank having therein a transverse partition for separating the tank into upper and lower compartments, a settling reservoir arranged adjacent to said tank, conduits connecting each of said compartments to said settling reservoir, means for introducing blow-off products from a boiler into said settling tank, a pump, a valve device arranged within said lower compartment for connecting the suction side of the pump either to the lower or to the upper compartment, and a float arranged within said lower compartment and connected to said valve for actuating the same.

13. In an apparatus of the character described, a tank having therein a transverse partition for separating it into upper and lower compartments, a settling reservoir arranged adjacent to said tank, a conduit connecting the upper compartment to the upper end of said settling reservoir, a conduit connecting the lower compartment to the lower end of said reservoir, means for introducing blow-off products from a boiler into said reservoir, means for introducing water to be heated into said upper compartment, a pump for withdrawing water from the lower compartment and a second pump for withdrawing water from the upper compartment.

14. In an apparatus of the character described, a tank having therein a transverse partition for dividing the tank into upper and lower compartments, a settling reservoir, a conduit connecting the upper compartment to the upper end of said settling reservoir, a conduit connecting the lower compartment with said reservoir, means for introducing blow-off products from a boiler into said reservoir, a spraying device arranged within the top of the upper compartment for spraying water to be heated into said compartment, and means for withdrawing water from each of said compartments.

15. In an apparatus of the character described, a main reservoir for storing heated water, an auxiliary reservoir arranged adjacent to said main reservoir, a conduit connecting the upper end of said auxiliary reservoir to the main reservoir, means for delivering blow-off products from a boiler directly into said auxiliary reservoir, and spraying devices located within the upper end of the main reservoir for spraying into the main reservoir water to be heated.

In testimony whereof, I sign this specification in the presence of two witnesses.

HORACE L. WINSLOW.

Witnesses:
HARRY S. GAITHER,
WM. F. FREUDENREICH.